United States Patent
Ino et al.

(10) Patent No.: US 10,166,816 B2
(45) Date of Patent: Jan. 1, 2019

(54) SOUND SOURCE DEVICE OF HORN

(71) Applicant: MAZDA MOTOR CORPORATION, Aki-gun, Hiroshima (JP)

(72) Inventors: Hisanobu Ino, Hiroshima (JP); Ikuyo Ohsugi, Hatsukaichi (JP); Noriyuki Nabeshima, Hiroshima (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 15/761,072

(22) PCT Filed: Mar. 6, 2017

(86) PCT No.: PCT/JP2017/008787
§ 371 (c)(1),
(2) Date: Mar. 16, 2018

(87) PCT Pub. No.: WO2017/163840
PCT Pub. Date: Sep. 28, 2017

(65) Prior Publication Data
US 2018/0257559 A1 Sep. 13, 2018

(30) Foreign Application Priority Data
Mar. 25, 2016 (JP) .................................. 2016-061618

(51) Int. Cl.
*B60Q 5/00* (2006.01)
*G10K 9/12* (2006.01)
(Continued)

(52) U.S. Cl.
CPC .................. *B60C 5/00* (2013.01); *G10K 9/12* (2013.01); *G10K 9/13* (2013.01); *G10K 9/20* (2013.01)

(58) Field of Classification Search
CPC ... B60Q 5/00; G10K 9/13; G10K 9/20; G10K 11/025; H04R 1/30; H04R 9/06; H04R 1/26
(Continued)

(56) References Cited

U.S. PATENT DOCUMENTS 6,317,033 B1* 11/2001 Kobayashi ............... G10K 9/13
340/384.73
6,816,065 B2* 11/2004 Viero ....................... G10K 9/15
116/142 FP
(Continued)

FOREIGN PATENT DOCUMENTS

JP 2011076018 A 4/2011
JP 2012068382 A * 4/2012
(Continued)

*Primary Examiner* — David Ton
(74) *Attorney, Agent, or Firm* — Alleman Hall Creasman & Tuttle LLP (57) ABSTRACT

A sound source device of a horn according to one aspect of the present invention includes: a diaphragm; a movable iron core connected to the diaphragm through a support point; and a coil (bobbin and winding) into which a driving signal is inputted. The driving signal includes a first signal component that resonates with the diaphragm and a second signal component of a second frequency that resonates with the movable iron core of a first frequency and has a chord relationship with the first frequency. The support point is provided at a position eccentric from the center of the diaphragm, and the movable iron core is structured such that a gravity center is displaced further in an eccentric direction than the support point.

4 Claims, 9 Drawing Sheets

(51) Int. Cl.
*G10K 9/13* (2006.01)
*G10K 9/20* (2006.01)
*B60C 5/00* (2006.01)

(58) Field of Classification Search
USPC .................................................. 381/340, 86
See application file for complete search history.

(56) References Cited

U.S. PATENT DOCUMENTS

| | | | | |
|---|---|---|---|---|
| 9,174,572 | B2* | 11/2015 | Bechtold | B60Q 5/00 |
| 2012/0092185 | A1* | 4/2012 | Hayashi | B60Q 5/008 |
| | | | | 340/904 |
| 2016/0080860 | A1* | 3/2016 | Kobayashi | H04R 1/30 |
| | | | | 381/340 |

FOREIGN PATENT DOCUMENTS

| | | | |
|---|---|---|---|
| JP | 2016218110 A | * | 12/2016 |
| JP | 2017072651 A | * | 4/2017 |

\* cited by examiner

SOUND SOURCE DEVICE OF HORN

TECHNICAL FIELD

The present invention relates to a sound source device of a horn mounted on a vehicle.

BACKGROUND ART

A horn, which vibrates a diaphragm with a movable iron core and outputs the sound generated by the diaphragm to the outside through a resonance tube, is mounted on a vehicle. Since the resonance tube has a spiral shape, there is a problem that foreign matter such as water cannot be removed if the foreign matter enters and accumulates in the resonance tube. Thus, PTL 1 discloses an electric horn for a vehicle, in which a foreign matter entry prevention member is affixed to a sound wave outlet opening portion of a resonance tube to prevent foreign matter flying from the front side of the vehicle from entering the resonance tube.

CITATION LIST

Patent Literature

PTL 1: JP 2011-76018 A

SUMMARY OF INVENTION

Technical Problem

If the sound outputted from the horn is made a chord, a sound comfortable to a passenger is outputted, which is considered to enhance enjoyment of driving. As a method of realizing the output of the chord, for example, a method of providing a plurality of horns which output sounds with different frequencies can be considered.

However, this method has a problem that the cost and weight increase because of a plurality of horns. Further, since an installation space for a horn is limited in the vehicle, it is not preferable to provide a plurality of horns.

Moreover, PTL 1 discloses an invention for preventing the entry of the foreign matter, which cannot output a chord by using one horn.

An object of the present invention is to provide a sound source device of a horn which outputs a chord from one diaphragm.

Solution to Problem

A sound source device according to one aspect of the present invention is a sound source device of a horn mounted on a vehicle, including: a diaphragm; a movable iron core connected to the diaphragm through a support point; and a coil into which a driving signal is inputted and which drives the movable iron core, the driving signal including a first signal component of a first frequency which resonates with the diaphragm, and a second signal component of a second frequency which resonates with the movable iron core and has a chord relationship with the first frequency, in which the support point is provided at a position eccentric from a center of the diaphragm, and the movable iron core is structured so that a gravity center of the movable iron core is displaced further in an eccentric direction of the support point than the support point.

According to this aspect, the diaphragm resonates with the first frequency, and a first sound is outputted. Further, the movable iron core resonates with the second frequency and vibrates so that the gravity center thereof swings about the support point. Herein, since the support point is eccentric from the center of the diaphragm, the amplitude in a region (first region) on the eccentric direction side of the support point is greater than the amplitude in a region (second region) on a side of the support point opposite to the eccentric direction. As a result, in the diaphragm, the vibrations of the second frequency in the first region and the second region become asymmetric and do not cancel each other, and a second sound is outputted.

However, with this alone, the area of the first region is small, and thus the second sound with a sufficient sound pressure cannot be obtained. Therefore, in this aspect, the gravity center of the movable iron core is displaced in the eccentric direction. Thus, the force of the movable iron core extending the second region increases upon swing, the amplitude of the vibration of the second frequency in the second region increases, and the second sound having a sufficient sound pressure can be outputted. Moreover, the first frequency and the second frequency have a chord relationship. Therefore, a chord including the first and second sounds is outputted from one horn.

In the above aspect, the movable iron core may be disposed to be inclined against a direction orthogonal to the diaphragm.

According to this aspect, since the movable iron core is inclined in an oblique direction, the vibration of the horizontal component is applied to the diaphragm from the movable iron core in addition to the vibration of the vertical component. Therefore, the sound pressure of the second sound can be higher.

In the above aspect, the movable iron core may include: a support portion which is disposed closer to the diaphragm than the gravity center and supports the movable iron core at the support point; and a main body portion which is connected to an end portion of the support portion on a side opposite to the support point and disposed so that a central axis of the main body portion is displaced in the eccentric direction from a central axis of the support portion.

According to this aspect, the gravity center of the movable iron core is displaced in the eccentric direction from the support point by disposing the main body portion so as to displace the central axis thereof from the central axis of the support portion.

In the above aspect, a length between the support point and the gravity center may be set to a length with which the second frequency of a target is obtained.

According to this aspect, since the length between the support point and the movable iron core is set to a length with which the second frequency of the target is obtained, it is possible to cause the diaphragm to output the second sound having the second frequency of the target.

Advantageous Effects of Invention

According to the present invention, a chord can be outputted from one horn.

DESCRIPTION OF EMBODIMENTS

Figure 1:
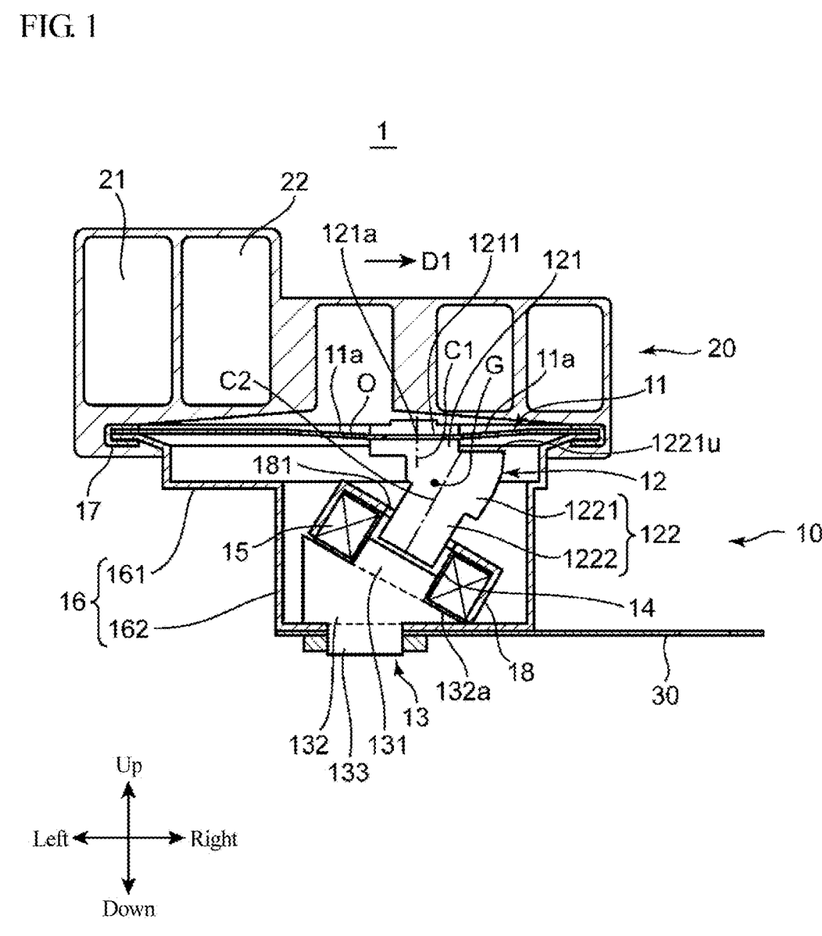
FIG. 1 is an internal configuration diagram of a horn having a sound source device according to an embodiment of the present invention.
Figure 2:
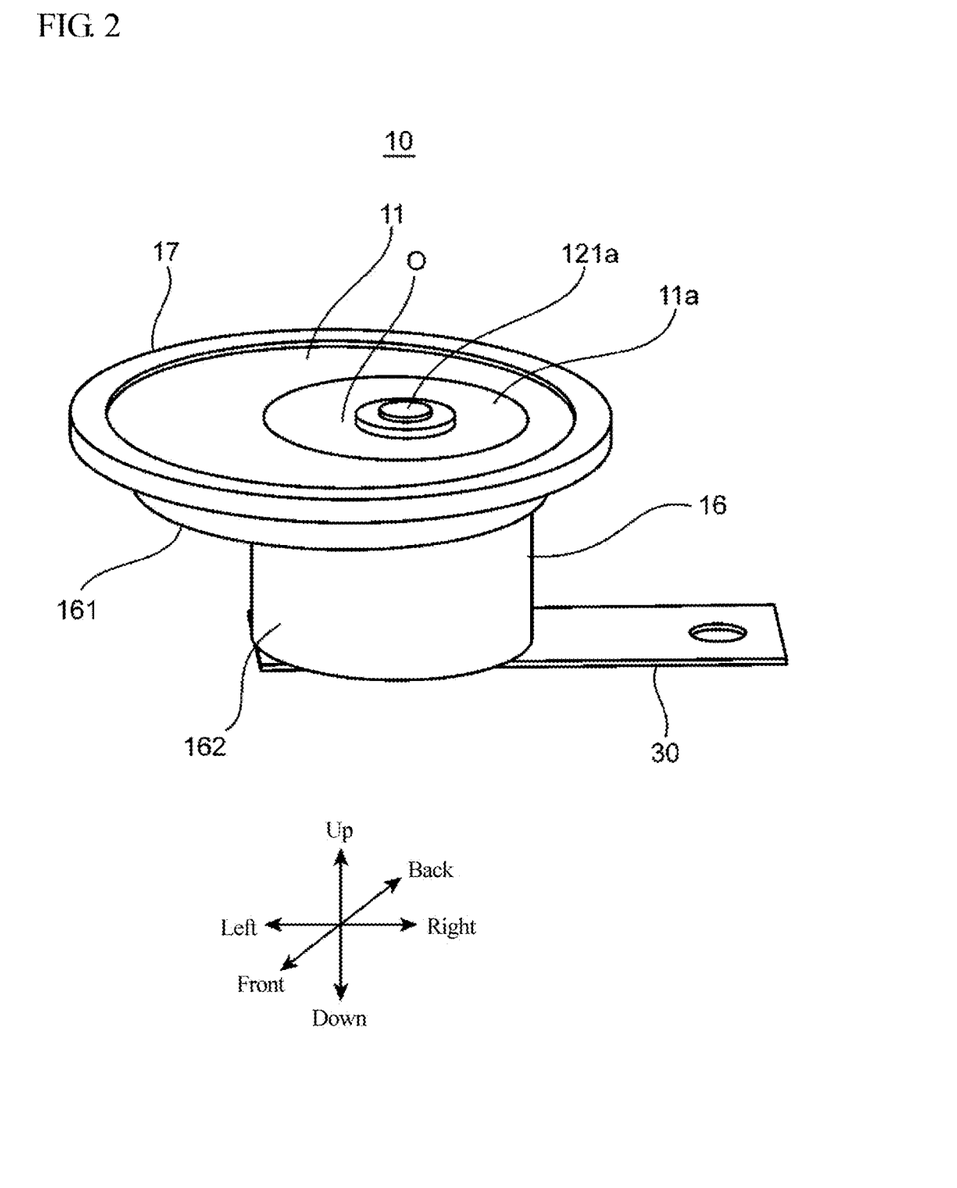
FIG. 2 is an external configuration diagram of the sound source device shown in FIG. 1.
Figure 3:
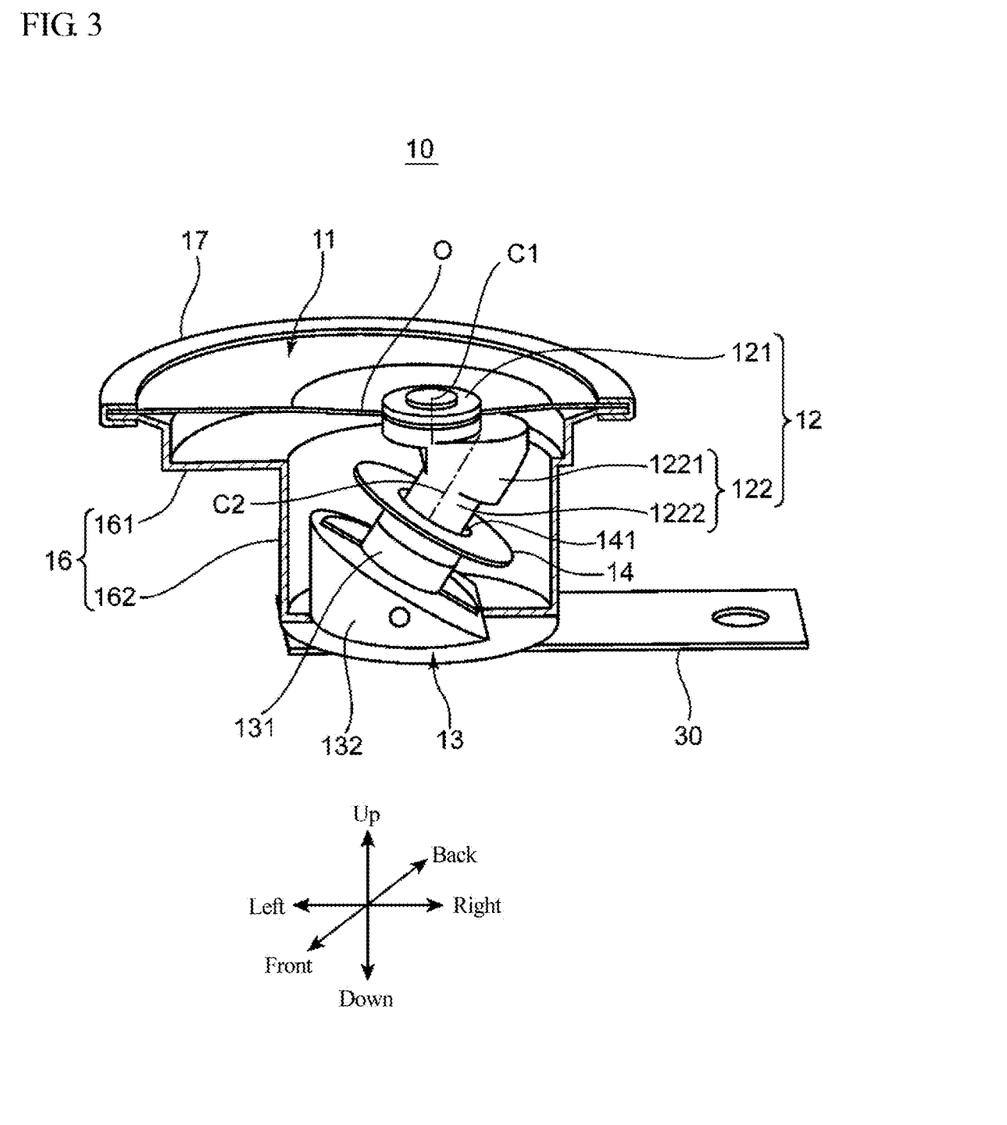
FIG. 3 is an internal configuration diagram of the sound source device shown in FIG. 2.
Figure 4:
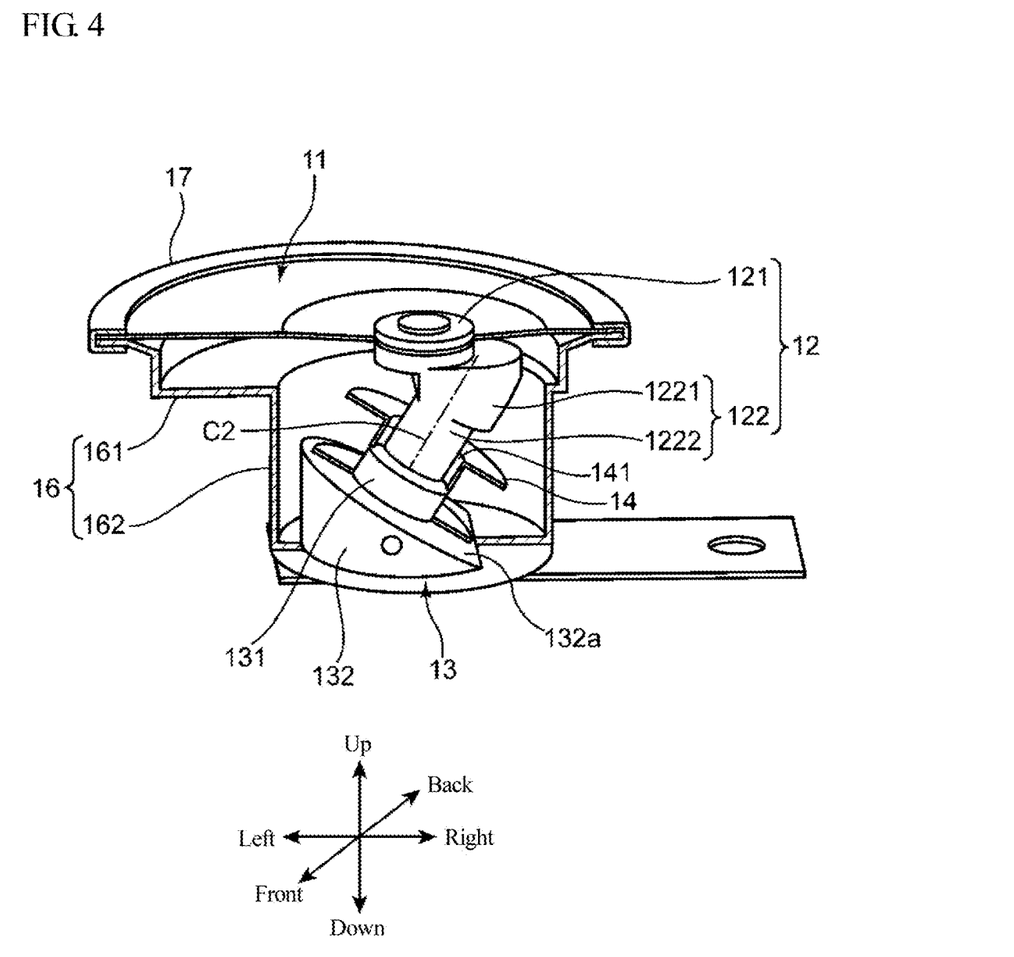
FIG. 4 is a diagram showing a cross section of a bobbin in the internal configuration diagram of FIG. 3.

FIG. 1 is an internal configuration diagram of a horn 1 having a sound source device 10 according to an embodiment of the present invention. FIG. 2 is an external configuration diagram of the sound source device 10 shown in FIG. 1. FIG. 3 is an internal configuration diagram of the sound source device 10 shown in FIG. 2. FIG. 4 is a diagram showing a cross section of a bobbin in the internal configuration diagram of FIG. 3. Hereinafter, the horn 1 will be described with reference to FIGS. 1 to 4 as appropriate. In FIGS. 1 to 4, on the paper surface, the upper side direction is referred to as an upside, the lower side direction is referred to as a downside, and a collective direction of the upside and the downside is referred to a vertical direction. Further, on the paper surface, the left side direction is referred to as a left side, the right side direction is referred to as a right side, and a collective direction of the left side and the right side is referred to as a horizontal direction. Moreover, a direction orthogonal to the vertical direction and the horizontal direction is referred to as a front-back direction, a direction toward the front in the front-back direction is referred to as a front side, and a direction toward the back is referred to as a back side.

As shown in FIG. 1, the horn 1 includes the sound source device 10 and a resonance tube 20. The sound source device 10 generates sound, and the resonance tube 20 is provided at the upside of the sound source device 10 and resonates with the sound outputted from the sound source device 10.

The sound source device 10 includes a diaphragm 11, a movable iron core 12, a fixed iron core 13, a bobbin 14, a winding 15, a case 16, an outer frame 17, a coil case 18, and a bracket 30. The movable iron core 12 is connected to the diaphragm 11 through a support point region 1211. The fixed iron core 13 is provided at the downside of the movable iron core 12. The bobbin 14 and the winding 15 constitute a coil. The case 16 accommodates the movable iron core 12, the fixed iron core 13, the bobbin 14, and the winding 15. The outer frame 17 attaches the outer edge of the diaphragm 11 to the outer edge of the case 16. The coil case 18 covers the upside and the side of the bobbin 14. The bracket 30 is attached to the downside of the bottom of the case 16.

Referring to FIG. 2, the diaphragm 11 is made of, for example, flexible discoid metal, vibrates by the vibration of the movable iron core 12, and outputs sound. The diaphragm 11 is placed on a circular edge provided at the uppermost side of the case 16 and fixed to the case 16 by being fitted by the outer frame 17. Referring to FIG. 1, the diaphragm 11 is provided with a taper 11a in which a certain region surrounding a support portion 121 is conically inclined toward the downside so that the diaphragm 11 is easily vibrated.

The movable iron core 12 is made of a magnetic material, and includes the support portion 121 that is connected to the diaphragm 11 through the support point region 1211, and a main body portion 122 that is provided at the lower side of the support portion 121.

The support portion 121 is cylindrical and sandwiches the support point region 1211 between both sides in the vertical direction. The support portion 121 is provided at a position where the center of the support point region 1211 (hereinafter referred to as a "support point 121a") is eccentric to the right side of the center O of the diaphragm 11. Herein, the direction in which the support point 121a is eccentric (herein, the right side) is described as an eccentric direction D1.

In general, the main body portion 122 is cylindrical and longer than the support portion 121, and an end portion on the upside of a central axis C2 is displaced in the eccentric direction D1 from a central axis C1 of the support portion 121. Note that the central axis C1 is directed in the vertical direction, that is, a direction orthogonal to the diaphragm 11, and passes through the support point 121a. In the example in FIG. 1, the central axis C2 is inclined to the left downside obliquely against the vertical direction. Thus, a gravity center G of the movable iron core 12 is displaced further in the eccentric direction D1 than the support point 121a. Specifically, the main body portion 122 includes a cylindrical portion 1222 that is cylindrical and has the central axis C2 as a longitudinal direction, and a bent portion 1221 that is provided at the upside of the cylindrical portion 1222 and bent toward the support portion 121.

In the example in FIG. 1, in order to displace the gravity center G further in the eccentric direction D1 than the support point 121a, the bent portion 1221 protrudes in the eccentric direction D1. Therefore, an upper surface 1221u of the bent portion 1221 is exposed.

The fixed iron core 13 includes a pedestal portion 132, a salient portion 131, and an engagement portion 133. The salient portion 131 protrudes from the center of the upper surface of the pedestal portion 132 in the direction of the central axis C2. The engagement portion 133 protrudes to the downside from the lower surface of the pedestal portion 132. Referring to FIG. 4, the pedestal portion 132 has an upper surface 132a orthogonal to the central axis C2, and a bobbin 14 is placed thereon. The salient portion 131 enters a hole 141 provided along the central axis of the bobbin 14 so that the bobbin 14 is fitted. Referring to FIG. 1, the engagement portion 133 is fitted into a hole provided at the bottom of the case 16. Thus, the fixed iron core 13 is fixed inside the case 16.

The bobbin 14 is made of a drum-shaped member around which the winding 15 is wound. Referring to FIG. 3, the movable iron core 12 is inserted into the hole 141 from the upside of the bobbin 14. The diameter of the hole 141 is slightly larger than the diameter of the cylindrical portion 1222 of the movable iron core 12. Thus, in addition to the vibration along the central axis C2, the movable iron core 12 is made capable of swinging about the support point 121a. Referring to FIG. 4, the lower surface of the cylindrical portion 1222 of movable iron core 12 abuts the upper surface of the salient portion 131. A signal generating device (not shown) is connected to the winding 15, and a driving signal, which includes a first signal component of a first frequency that resonates with the diaphragm 11 and a second signal component of a second frequency that resonates with the movable iron core 12, is inputted thereto.

Referring to FIG. 1, the coil case 18 is provided above the pedestal portion 132 so as to cover the upside of the bobbin 14 and the outer peripheral surface of the winding 15. At the center of the upper surface of the coil case 18, the hole is formed to insert the movable iron core 12 into the bobbin 14. Further, a packing 181 is attached to the inner periphery of the hole of the coil case 18. This packing 181 closes the space between the coil case 18 and the movable iron core 12 and supports the movable iron core 12.

Referring to FIG. 2, the case 16 includes a discoid upper portion 161 and a lower portion 162 provided at the downside of the upper portion 161. The upper portion 161 has a cross section that is concentric with the diaphragm 11. The lower portion 162 has a cross section that is concentric with the support point 121a and has a cylindrical shape with a longer length in the vertical direction than the upper portion 161.

The bracket 30 has a rectangular shape extending to the right side from the lower surface of the lower portion 162 and is provided with a hole for attaching the horn 1 to the inside of the vehicle at the right end.

Referring to FIG. 1, the resonance tube 20 includes a main resonance tube that has an opening portion above the center O of the diaphragm 11, and a branch resonance tube that branches from the main resonance tube. The main resonance tube and the branch resonance tube are spiral. A chord including a first sound and a second sound is inputted to the main resonance tube. The main resonance tube resonates with one of the first sound and the second sound and outputs the one sound from an opening portion 21. The branch resonance tube resonates with the other one of the first sound and the second sound and outputs the other sound from an opening portion 22.

The operation of the sound source device 10 shown in FIG. 1 will be briefly described. When the driving signal from the signal generating device (not shown) is applied to the winding 15, the movable iron core 12 is driven by receiving the electromagnetic force from the winding 15. Herein, since the first signal component included in the driving signal has the first frequency that resonates with the diaphragm 11, the diaphragm 11 vibrates in the vertical direction by the movable iron core 12 and generates the first sound with the first frequency as the fundamental frequency. Further, since the second signal component included in the driving signal has the second frequency that resonates with the movable iron core 12, the movable iron core 12 swings about the support point 121a. Thus, the diaphragm 11 generates the second sound with the second frequency as the fundamental frequency.

As the first frequency and the second frequency, an imperfect consonance may be adopted, or a perfect consonance may be adopted. Herein, an imperfect consonance with the first and second sounds having a frequency ratio of 1.25 is adopted, but is not limited thereto.

Figure 5:
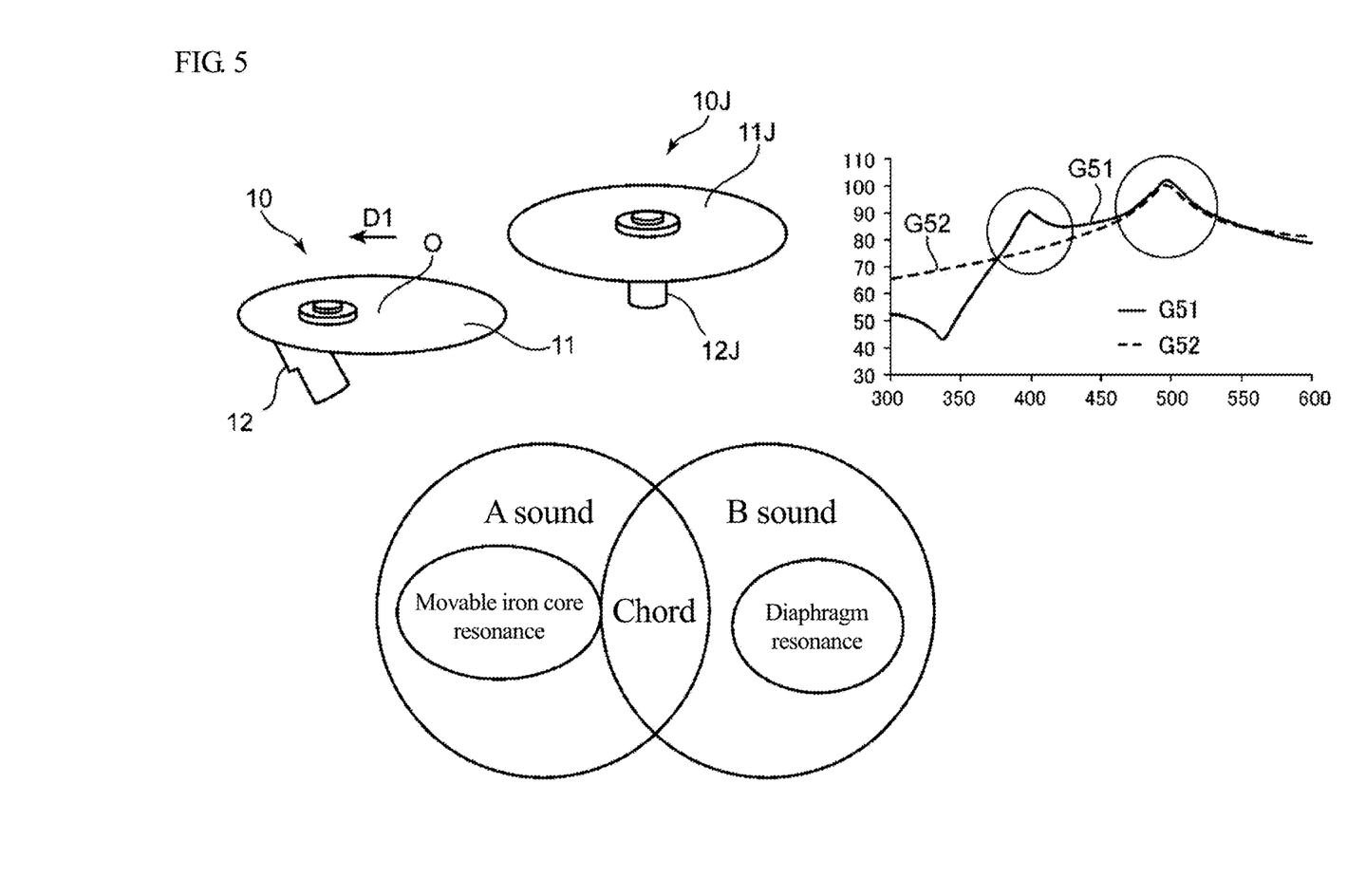
FIG. 5 is a diagram for comparing the sound source device of this embodiment with a sound source device of a comparative example.

FIG. 5 is a diagram for comparing the sound source device 10 of this embodiment with a sound source device 10J of a comparative example. In the graph in FIG. 5, characteristics G51 indicate the frequency characteristics of the sound source device 10, and characteristic G52 indicate the frequency characteristics of the sound source device 10J of the comparative example. Note that, in the graph in FIG. 5, the vertical axis represents the sound pressure, and the horizontal axis represents the frequency.

In the sound source device 10J, a movable iron core 12J is attached to the center of a diaphragm 11J. Therefore, the characteristic G52 have only one resonance frequency observed around 500 Hz. On the other hand, in the sound source device 10, the movable iron core 12 is attached to the diaphragm 11 eccentrically from the center O of the diaphragm 11, and the gravity center G of the movable iron core 12 is displaced in the eccentric direction D1. Therefore, the characteristics G51 have a resonance frequency, which is caused by the resonance of the diaphragm 11 and observed around 500 Hz, and a resonance frequency which is caused by the resonance of the movable iron core 12 and observed around 400 Hz. Thus, the diaphragm 11 generates a chord having the second sound (A sound) caused by the resonance of the movable iron core 12, in addition to the first sound (B sound) caused by the resonance of the diaphragm 11.

Figure 6:
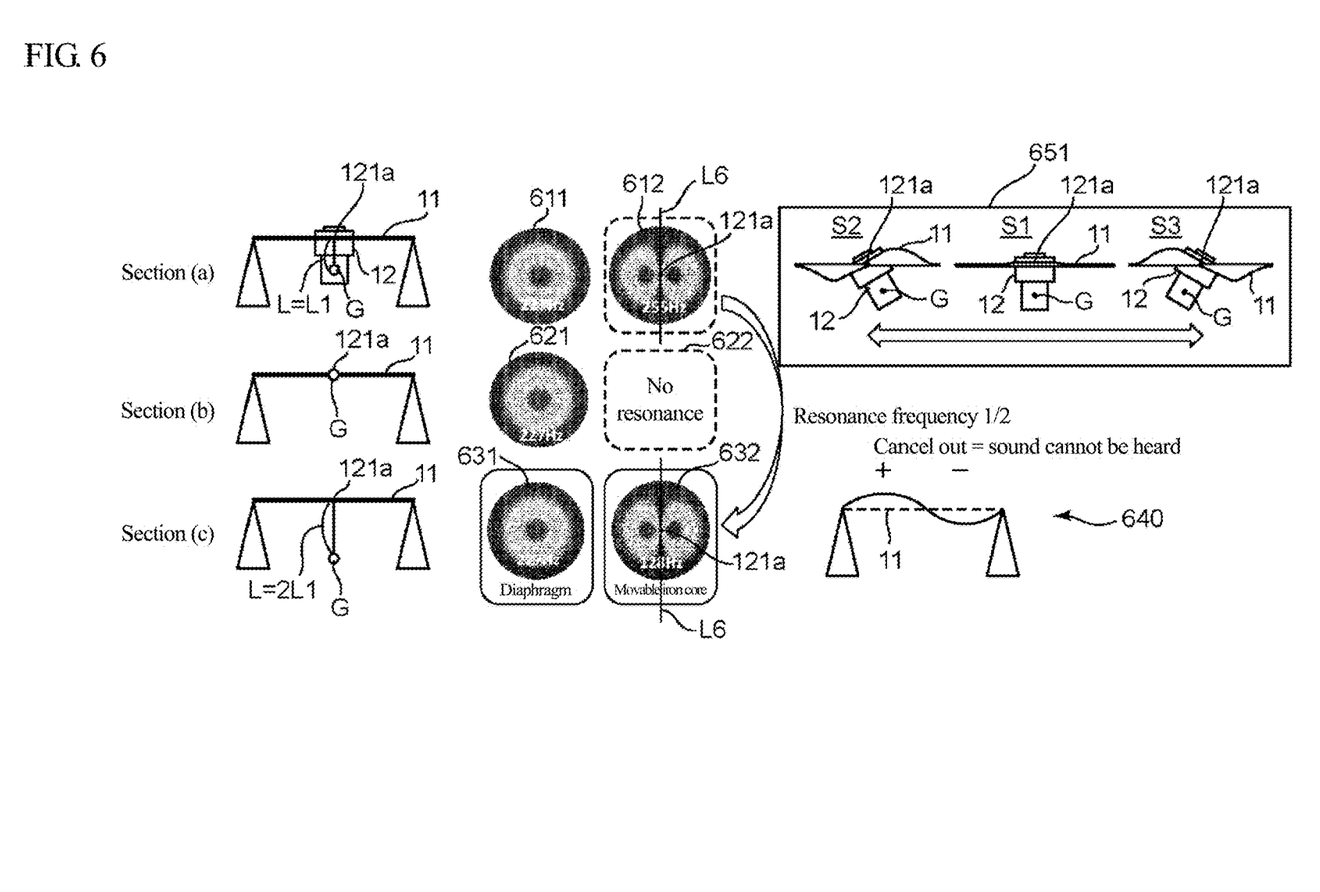
FIG. 6 is a diagram showing the relationship between the resonance and the length between a gravity center and a support point of a movable iron core.

FIG. 6 is a diagram showing the relationship between the resonance and a length L between the gravity center G and the support point 121a of the movable iron core 12. A section (a) shown in the first row shows a case where the length L is L1, a section (b) shown in the second row shows a case where the length L is 0, and a section (C) shown in the third row shows a case where the length L is 2×L1. Further, in the sections (a) to (c), the circles shown at the center indicate respective sound pressure distributions 611, 612, 621, 622, 631 and 632 of vibrations generated at the diaphragm 11, and the sound pressure decreases from the center of the concentric circles. The sound pressure distributions 611, 621 and 631 are the sound pressure distributions of vibrations generated at the diaphragm 11 due to the resonance of the diaphragm 11 (hereinafter referred to as "first vibration"), and the sound pressure distributions 612, 622 and 632 are the sound pressure distributions of vibrations generated at the diaphragm 11 due to the resonance of the movable iron core 12 (hereinafter referred to as "second vibration").

A frame 651 is a diagram showing the swing motion of the movable iron core 12. In the example in the frame 651, the central drawing shows a state S1 (neutral state) in which the movable iron core 12 is directed in the vertical direction, the left drawing shows a state S2 in which the movable iron core 12 swings to the rightmost side, and the right drawing shows a state S3 in which the movable iron core 12 swings to the leftmost side. As shown in the states S1 to S3, it can be seen that the movable iron core 12 swings horizontally symmetrically due to the resonance.

Particularly, in the diaphragm 11, as the state S1 transitions into the state S2, deflection toward the downside increases in a region on the left side of the support point 121a and deflection toward the upside increases in a region on the right side of the support point 121a. Further, in the diaphragm 11, as the state S1 transitions into the state S3, the deflection toward the upside increases in the region on the left side of the support point 121a and the deflection toward the downside increases in the region on the right side of the support point 121a. Thus, as shown in the sound pressure distributions 612 and 632, the second vibration has a sound pressure distribution having two symmetrical peaks about a line L6 passing through the support point 121a in the front-back direction.

Since the movable iron core 12 swings horizontally about the support point 121a, the swing motion of the movable iron core 12 can be considered to be the swing motion of the pendulum of the gravity center G about the support point 121a. This is shown in the three drawings shown in the left column in FIG. 6.

In the example in the section (a), the resonance frequency of the second vibration is 255 Hz as shown in the sound pressure distribution 612 due to the swing motion of the pendulum with the length L=L1. On the other hand, in the example in the section (c), since the length is twice the length in the section (a), the resonance frequency of the second vibration is half the resonance frequency of section (a) (=128 Hz) as shown in the sound pressure distribution 632. Further, in the example in the section (b), since the gravity center G coincides with the support point 121a and the movable iron core 12 does not swing, the second vibration is not generated as shown in the sound pressure distribution 622.

Thus, since the swing motion of the movable iron core 12 is considered to be the swing motion of the pendulum of the gravity center G; it can be seen that the resonance frequency of the second vibration generated at the diaphragm 11 due to the swing motion decreases if the length L is lengthened.

On the other hand, since the first vibration is caused by the resonance of the diaphragm 11 and does not depend on the swing motion of the movable iron core 12, the same resonance frequency of 227 Hz is obtained in all the sections (a) to (c).

By providing the gravity center G at the downside of the support point 121a in this manner, it is possible to generate the second vibration at the diaphragm 11. However, if the gravity center G is provided just below the support point 121a, the amplitudes of the second vibration, which are point symmetrical about the support point 121a, occur as shown in the states S2 and S3. Therefore, as shown in a schematic diagram 640, the positive amplitude and the negative amplitude of the second vibration cancel each other, and the sound caused by the second vibration, that is, the second sound is not generated from the diaphragm 11.

Figure 7:
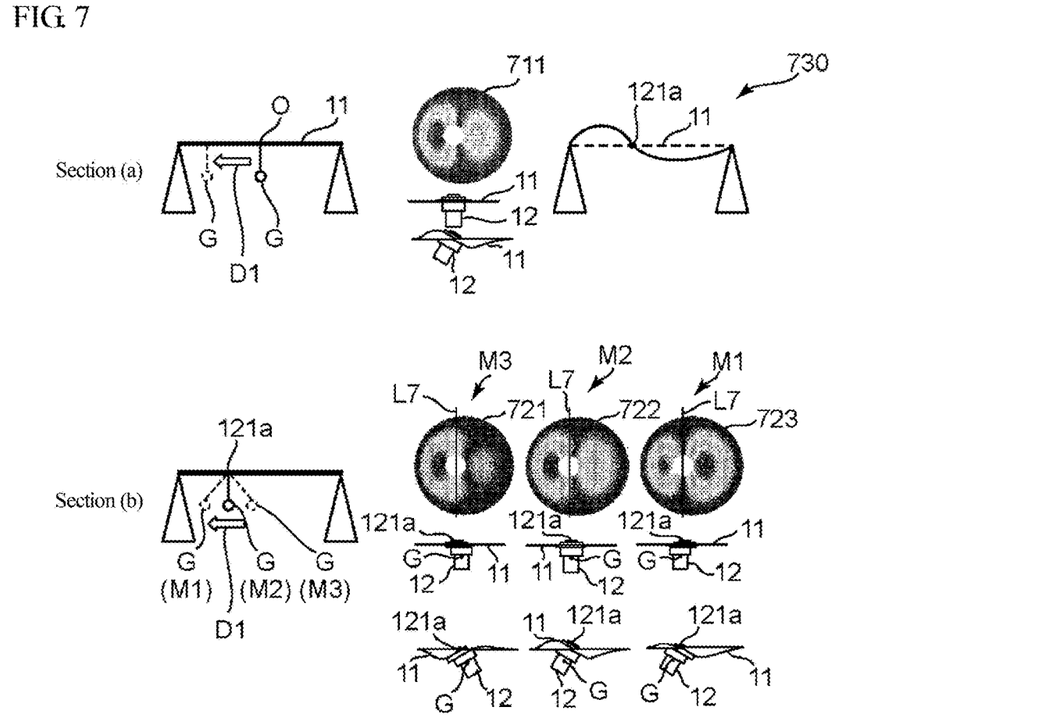
FIG. 7 is a diagram for describing the operation in a case where the support point is eccentric from the center of a diaphragm.

Thus, as shown in FIG. 7, the sound source device 10 has the support point 121a eccentric from the center O of the diaphragm 11 in the eccentric direction D1. FIG. 7 is a diagram for describing the operation in a case where the support point 121a is eccentric from the center O of the diaphragm 11. A section (a) shows a condition of the second vibration in a case where the support point 121a is eccentric from the center O of the diaphragm 11. In the example in the section (a), the support point 121a is displaced in the eccentric direction D1 (herein, the left side) from the center O. In this case, as shown in a schematic diagram 730 and a sound pressure distribution 711, since the amplitudes of the second vibration become larger on the left side than the right side of the support point 121a and become asymmetric, the second vibration is not canceled out, and the second sound is generated from the diaphragm 11. However, since the sound pressure of the second sound is determined by the vibration area×the amplitude, the diaphragm 11 vibrates greatly only in a small region on the left side of the support point 121a, and the second sound with a sufficient sound pressure cannot be obtained.

Thus, the sound source device 10 has the gravity center G of the movable iron core 12 displaced toward the eccentric direction D1. A section (b) in FIG. 7 is a diagram showing the respective relationships between eccentric patterns M1, M2 and M3 of the gravity center G of the movable iron core 12 and sound pressure distributions 721, 722 and 723. The eccentric pattern M1 is a pattern in which the gravity center G is displaced in the eccentric direction D1 from the support point 121a, and is a structure according to this embodiment. The eccentric pattern M2 is a pattern in which the gravity center G is disposed just below the support point 121a, and is the same pattern as the section (a). The eccentric pattern M3 is a pattern in which the gravity center G is displaced in the direction opposite to the eccentric direction D1 from the support point 121a.

The sound pressure distribution 722 in the eccentric pattern M2 is the same as the sound pressure distribution 711 in the section (a). In the eccentric pattern M3, as shown in the sound pressure distribution 721, the diaphragm 11 greatly vibrates in a region on the left side of a line L7 passing through the support point 121a in the front-back direction as in the eccentric pattern M2, but the vibration of the diaphragm 11 is smaller than that in the eccentric pattern M2 in a region on the right side of the line L7. Therefore, with the eccentric patterns M2 and M3, the second sound with a sufficient sound pressure cannot be obtained.

In contrast, since the gravity center G is displaced toward the eccentric direction D1 in the eccentric pattern M1, the diaphragm 11 is greatly extended by the movable iron core 12 at a region on the right side of the line L7 when the movable iron core 12 swings. Thus, the vibration of the diaphragm 11 in the region on the right side of the line L7 is greater than that in the eccentric pattern M2. Thus, with the eccentric pattern M1, the second sound with a sufficient sound pressure can be obtained.

Figure 8:
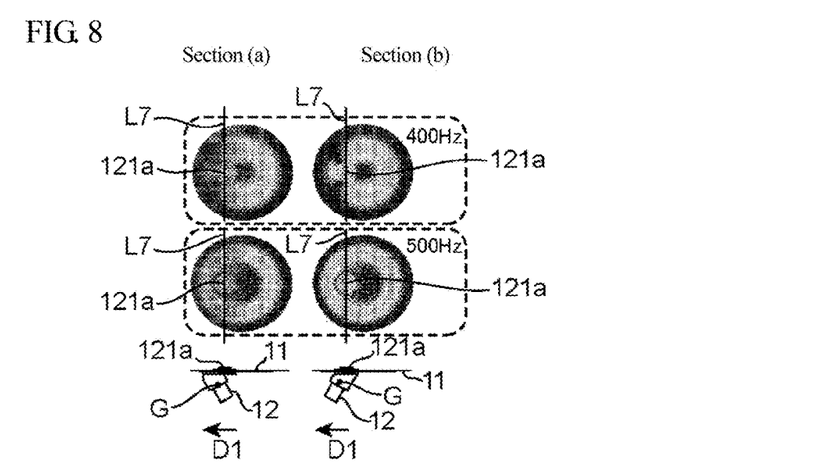
FIG. 8 is a diagram showing sound pressure distributions according to the shape of the movable iron core.

FIG. 8 is a diagram showing the sound pressure distributions according to the shape of the movable iron core 12. The gravity center G is displaced in the eccentric direction D1 in both sections (a) and (b), but the shape of the movable iron core 12 is different. The shape of the movable iron core 12 in the section (a) is substantially the same as the shape shown in FIGS. 1 to 4, but the shape of the movable iron core 12 in the section (b) is different from the shape shown in FIGS. 1 to 4. Moreover, the longitudinal direction of the movable iron core 12 is directed to the direction orthogonal to the diaphragm 11 in the neutral state in FIG. 7, but the longitudinal direction of the movable iron core 12 is inclined against the direction orthogonal to the diaphragm 11 in the neutral state in both of the sections (a) and (b) of FIG. 8.

Figure 9:
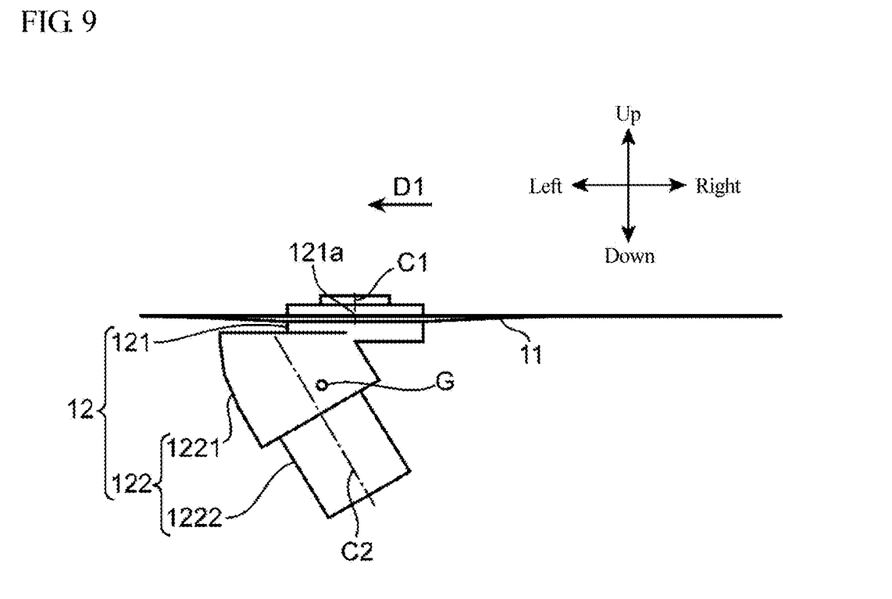
FIG. 9 is an enlarged view of the movable iron core shown in the section (a) of FIG. 8.
Figure 10:
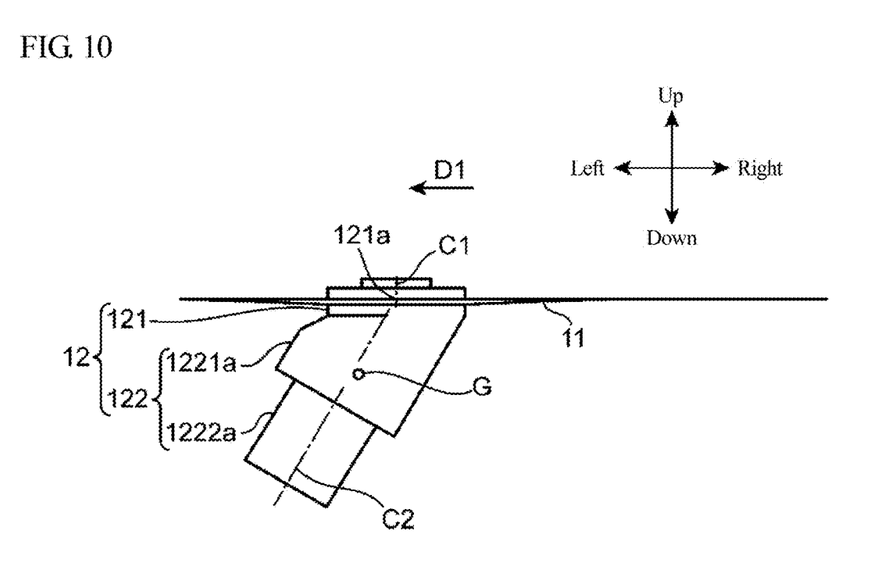
FIG. 10 is an enlarged view of the movable iron core shown in the section (b) of FIG. 8.

FIG. 9 is an enlarged view of the movable iron core 12 shown in the section (a) of FIG. 8. FIG. 10 is an enlarged view of the movable iron core 12 shown in section (b) of FIG. 8. Hereinafter, the movable iron core 12 shown in FIG. 9 will be described as a first example of the movable iron core 12, and the movable iron core 12 shown in FIG. 10 will be described as a second example of the movable iron core 12.

Similarly to the movable iron core 12 described above in FIGS. 1 to 4, the gravity center G of the movable iron core 12 of the first example is displaced in the eccentric direction D1 from the support point 121a by displacing an end portion of the central axis C2 of the main body portion 122 near the support portion 121 in the eccentric direction D1 from the central axis C1 of the support portion 121. However, the surface of the bent portion 1221 near the support point 121a is directed in a direction parallel to the central axis C2 in the movable iron core 12 shown in FIG. 9, whereas the surface of the bent portion 1221 near the support point 121a is directed in the vertical direction in the movable iron core 12 shown in FIG. 1. Thus, there is a slight difference. Other than that, the movable iron core 12 shown in FIG. 9 has no substantial difference from the movable iron core 12 shown in FIG. 1 so a detailed explanation thereof will be omitted.

The gravity center G of the movable iron core 12 of the second example is displaced in the eccentric direction D1 by inclining the central axis C2 of the main body portion 122 toward the eccentric direction D1. Particularly, the movable iron core 12 is cylindrical, has the central axis C1 directed in the vertical direction, and includes the support portion 121 passing through the support point 121a, which are the same as in the first example.

Moreover, the movable iron core 12 of the second example has the central axis C2 intersecting the central axis C1 at the support point 121a and includes a substantially cylindrical main body portion 122 inclined toward the eccentric direction D1. Thus, in the movable iron core 12 of the second example, the gravity center G is positioned on the central axis C2 at the downside of the support point 121a and displaced toward the eccentric direction D1 from the support point 121a. More particularly, the main body portion 122 includes an upper cylindrical portion 1221a that is provided near the support portion 121, and a lower cylindrical portion 1222a that is provided at the downside of the upper cylindrical portion 1221a.

Herein, by making the diameter of the upper cylindrical portion 1221a longer than that of the lower cylindrical portion 1222a, the upper cylindrical portion 1221a is made heavier than the lower cylindrical portion 1222a. Thus, the position of the gravity center G is prevented from being positioned excessively in the downside.

As shown in the first row in FIG. 8, it can be seen that, for the movable iron cores 12 of the first and second examples, large second vibrations (herein, 400 Hz) are observed in wide regions on the right side of the line L7, and substantially the same sound pressure distributions are observed. Further, as shown in the second row in FIG. 8, it can be seen that, for the movable iron cores 12 of the first and second examples, first vibrations (herein, 500 Hz) are observed in wide regions around the center O, and substantially the same sound pressure distributions are observed.

As can be seen from the comparison between the sections (a) and (b) of FIG. 8, even when the shape of the movable iron core 12 is different, it is possible to obtain the first and second vibrations with high sound pressures and generate the first sound and the second sound if the gravity center G is displaced further in the eccentric direction D1 than the support point 121a.

Figure 11:
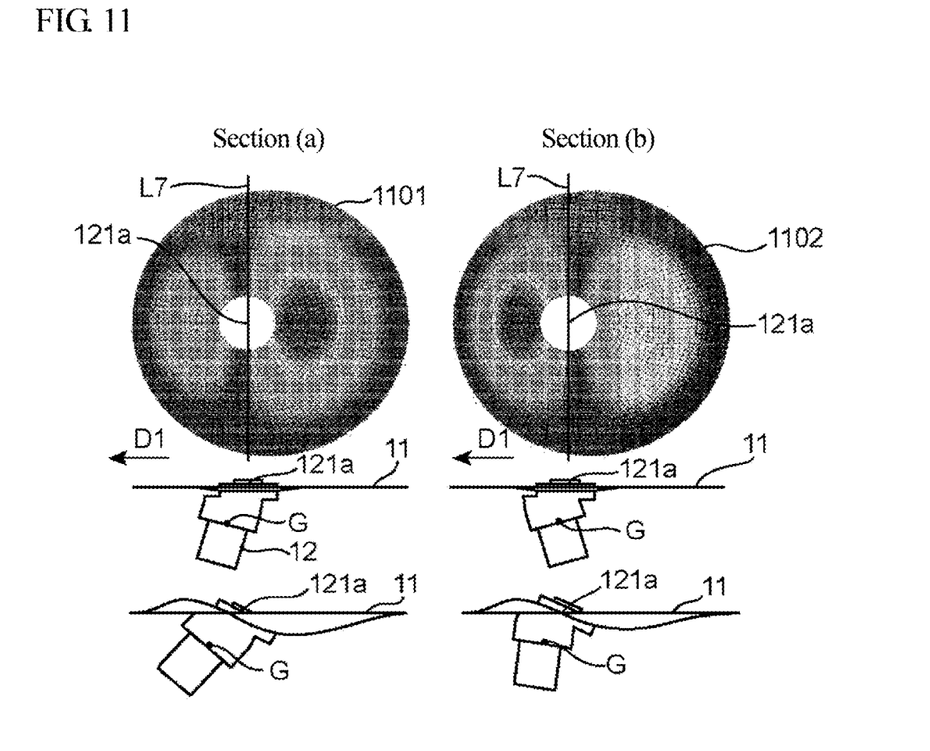
FIG. 11 is a diagram for comparing the sound pressure distributions of the second vibrations caused by different inclination directions of the movable iron core.

FIG. 11 is a diagram for comparing the sound pressure distributions of the second vibrations caused by different inclination directions of the movable iron core 12. A section (a) shows a case where the movable iron core 12 is inclined toward the eccentric direction D1, and a section (b) shows a case where the movable iron core 12 is inclined to the side opposite to the eccentric direction D1. Hereinafter, the inclination pattern of the section (a) is referred to as a first inclination pattern, and the inclination pattern of the section (b) is referred to as a second inclination pattern. Note that, in FIG. 11, the second row shows neutral states in both inclination patterns, and the third row shows the maximum swing states to the left in both inclination patterns. Moreover, by adopting the movable iron core 12 of the first example described above, the gravity center G is displaced in the eccentric direction D1 in both the first and second inclination patterns.

As can be seen from the comparison between sound pressure distributions 1101 and 1102 in the sections (a) and (b), the sound pressure in a region on the right side of the line L7 was slightly higher in the first inclination pattern than the second inclination, but the sound pressure in a region on the left side of the line L7 was slightly lower in the first inclination pattern than the second inclination pattern. These differences are considered to be caused by the difference in the amount of displacement of the gravity center G in the eccentric direction D1 from the support point 121a in the first and second inclination patterns. In either case, it can be seen that, in both inclination patterns, the second vibration having a sufficient sound pressure is obtained in total.

However, as shown in the section (a), since the movable iron core 12 is displaced toward the eccentric direction D1 in the first inclination pattern, there is a possibility that the driving members such as the fixed iron core 13 and the winding 15 project from the left end of the diaphragm 11. On the other hand, as shown in the section (b), since the movable iron core 12 is displaced to the side opposite to the eccentric direction D1 in the second inclination pattern, the driving members such as the fixed iron core 13 and the winding 15 can be collected toward the center O of the diaphragm 11. Therefore, the second inclination pattern has advantages such that the sound source device 10 can be compactly assembled.

As shown by the first and second inclination patterns, the component of the force applied to the diaphragm 11 in the horizontal direction is greater in the case where the movable iron core 12 is inclined than the case where the movable iron core 12 is directed in the vertical direction. Therefore, the force contributing to the second vibration is increased, and the louder second sound can be generated.

According to the sound source device 10 described above, the diaphragm 11 resonates with the first frequency, and the first sound is outputted. And, the support point 121a is eccentric from the center O of the diaphragm 11, and the gravity center G of the movable iron core 12 is displaced further in the eccentric direction D1 than the support point 121a. Therefore, the movable iron core 12 swings by the second frequency, and the second sound having a sufficient sound pressure can be outputted from the diaphragm 11. Moreover, the first frequency and the second frequency have a chord relationship. Therefore, the sound source device 10 can output a chord including the first and second sounds.

<Supplement>

(1) In the example in FIG. 1, the movable iron core 12 is inclined, but the movable iron core 12 is not necessarily inclined. For example, as shown in the eccentric pattern M1 in FIG. 7, the movable iron core 12 may be directed to the vertical direction at the time of being neutral. With this configuration, the second vibration having a sufficient sound pressure can also be obtained as described with the sound pressure distribution 723 in FIG. 7.

(2) The diameter of the diaphragm 11 may be designed to have a length that resonates with the first frequency of a target. Further, the movable iron core 12 may be designed to have the entire length and shape so that the length L between the support point 121a and the gravity center G becomes a length that resonates with the second frequency of a target.

LIST OF REFERENCE CHARACTERS

C1 central axis
C2 central axis
D1 eccentric direction
G gravity center
O center
1 horn
10 sound source device
11 diaphragm
12 movable iron core
13 fixed iron core
14 bobbin
15 winding
16 case
17 outer frame
18 coil case 20 resonance tube
30 bracket
12 support portion
121a support point
122 main body portion
1211 support point region
1221 bent portion
1221a upper cylindrical portion
1222 cylindrical portion
1222a lower cylindrical portion

The invention claimed is:

1. A sound source device of a horn mounted on a vehicle, comprising:
    a diaphragm;
    a movable iron core connected to the diaphragm through a support point; and
    a coil into which a driving signal is inputted and which drives the movable iron core, the driving signal including a first signal component of a first frequency which resonates with the diaphragm, and a second signal component of a second frequency which resonates with the movable iron core and has a chord relationship with the first frequency, wherein
    the support point is provided at a position eccentric from a center of the diaphragm, and
    the movable iron core is structured so that a gravity center of the movable iron core is displaced further in an eccentric direction of the support point than the support point.

2. The sound source device according to claim 1, wherein the movable iron core is disposed to be inclined against a direction orthogonal to the diaphragm.

3. The sound source device according to claim 1, wherein the movable iron core includes: a support portion which is disposed closer to the diaphragm than the gravity center and supports the movable iron core at the support point; and a main body portion which is connected to an end portion of the support portion on a side opposite to the support point and disposed so that a central axis of the main body portion is displaced in the eccentric direction from a central axis of the support portion.

4. The sound source device according to claim 1, wherein a length between the support point and the gravity center is set to a length with which the second frequency of a target is obtained.

* * * * *